(12) United States Patent
Lee et al.

(10) Patent No.: US 7,979,744 B2
(45) Date of Patent: Jul. 12, 2011

(54) FAULT MODEL AND RULE BASED FAULT MANAGEMENT APPARATUS IN HOME NETWORK AND METHOD THEREOF

(75) Inventors: Chang-Eun Lee, Daejon (KR); Kyeong-Deok Moon, Daejon (KR); Jun-Hee Park, Daejon (KR); Dong-Hee Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 398 days.

(21) Appl. No.: 11/949,234

(22) Filed: Dec. 3, 2007

(65) Prior Publication Data
US 2008/0133979 A1 Jun. 5, 2008

(30) Foreign Application Priority Data

Dec. 4, 2006 (KR) .................. 10-2006-0121246
Oct. 29, 2007 (KR) .................. 10-2007-0109014

(51) Int. Cl.
*G06F 11/00* (2006.01)
(52) U.S. Cl. ........................................................ 714/26
(58) Field of Classification Search .................. 714/26
See application file for complete search history.

(56) References Cited

U.S. PATENT DOCUMENTS

| 6,131,166 A * | 10/2000 | Wong-Insley ............... 713/300 |
| 6,779,184 B1 * | 8/2004 | Puri et al. ................... 719/315 |
| 6,892,317 B1 | 5/2005 | Sampath et al. |
| 2002/0046301 A1 * | 4/2002 | Shannon et al. ............. 709/328 |

FOREIGN PATENT DOCUMENTS

| JP | 2002-342185 A | 11/2002 |
| KR | 1020030035181 A | 5/2003 |
| KR | 1020060061009 | 6/2006 |

* cited by examiner

*Primary Examiner* — Bryce P Bonzo
(74) *Attorney, Agent, or Firm* — Ladas & Parry LLP

(57) ABSTRACT

Provided are a fault model and rule based fault management apparatus and method for a home network. The fault management apparatus includes: a plurality of fault generation unit formed in a multilevel structure and generating fault notification when a fault is generated; a plurality of fault communication unit for transferring fault notification from one of the fault generation unit; a fault agent unit for transferring each fault notification from a plurality of the fault communication unit; and a fault diagnosis and process unit for receiving the fault notification from the fault agent unit, diagnosing a corresponding fault, and processing the corresponding fault using a fault model, a fault decision rule, and a fault process rule.

20 Claims, 5 Drawing Sheets

| System | Fault agent ID | Module ID | Module type | Module name |
|---|---|---|---|---|
| A | FA1 | Application 1234 | Application | Application program |
| A | FA1 | Network 11 | Network | Network resource |
| A | FA1 | Kernel 1 | Kernel | System kernel |
| B | FA2 | Device 11 | Device | LonWorks |
| B | FA2 | Kernel 2 | Kernel | System kernel |
| B | FA2 | Network 1 | Network | Network resource |

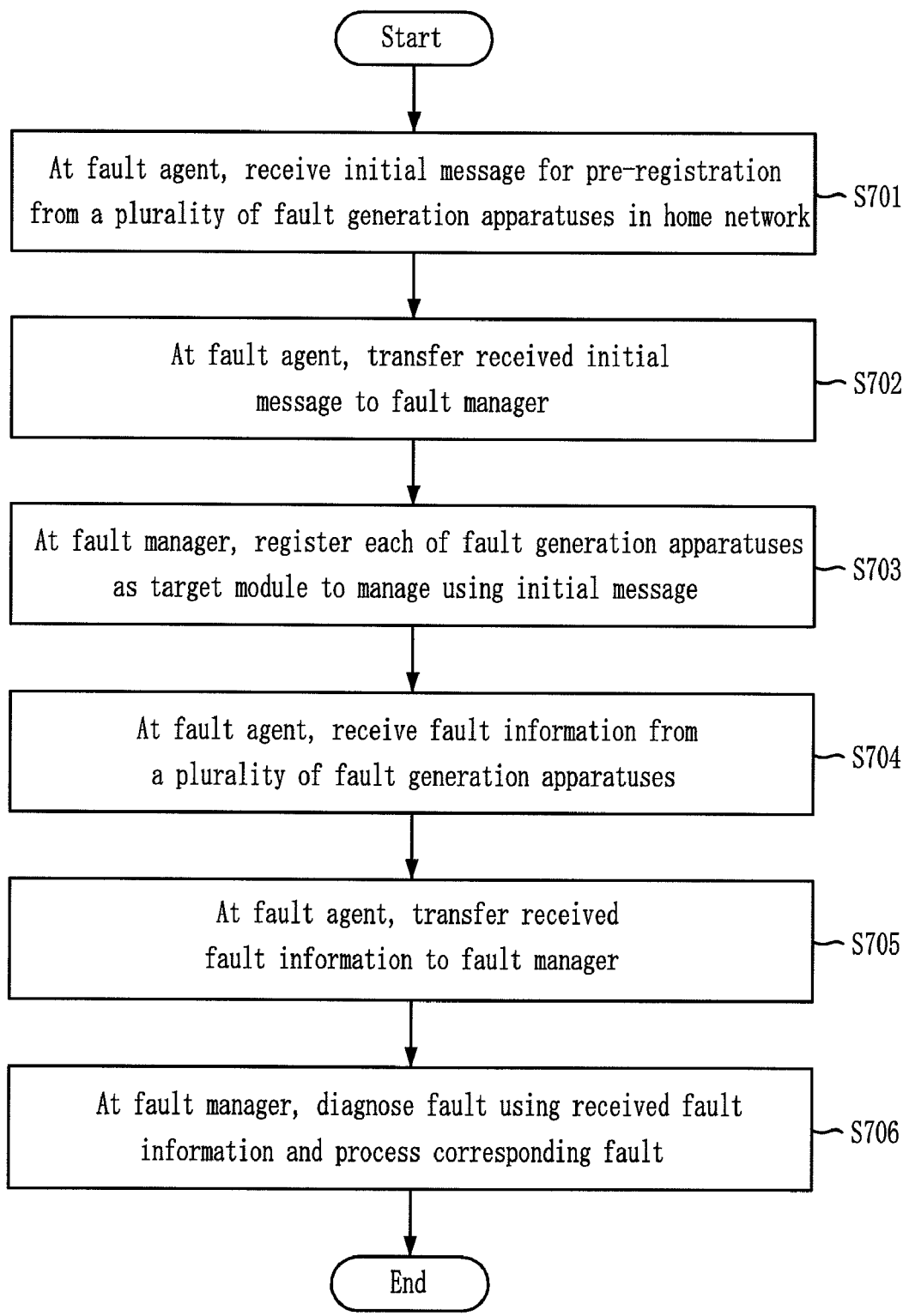

FAULT MODEL AND RULE BASED FAULT MANAGEMENT APPARATUS IN HOME NETWORK AND METHOD THEREOF

CROSS-REFERENCES TO RELATED APPLICATIONS

The present invention claims priority of Korean Patent Application Nos. 10-2006-0121246 and 10-2007-0109014, filed on Dec. 4, 2006 and Oct. 29, 2007, respectively, which are incorporated herein by reference.

BACKGROUND OF THE INVENTION

1. Field of the Invention

The present invention relates to a fault model and rule based fault management apparatus and method for a home network and, more particularly, to a fault model and rule based fault management apparatus and method for improving the reliability of a home network and reducing a maintenance cost of a home network by defining fault models for possible faults generated from various fault generation apparatus distributed in a home network, such as a device, a network, a system, and an application program, defining fault decision rules for diagnosing a cause of a fault, defining fault process rules for each cause, and diagnosing and processing a fault based on the defined fault model, the defined fault decision rules, and the defined fault process rules when the fault is generated in a home network.

This work was supported by the Information Technology (IT) research and development program of the Korean Ministry of Information and Communication (MIC) and/or the Korean Institute for Information Technology Advancement (IITA) [2006-S-066-01, "Development of High Reliable Adaptive Middleware for u-Home"].

2. Description of Related Art

According to the abrupt development of a home network technology, there have been many studies in progress for developing a method for managing faults generated in a home network. A home network has a characteristic of a complex system where various devices and software are distributed over the entire home network.

Hereinafter, a fault management technology for a home network according to the related art will be described with reference to FIG. 1.

FIG. 1 is a block diagram illustrating a fault management apparatus for sensing faults and performing restoration according to the related art.

As shown in FIG. 1, the fault management apparatus according to the related art includes a watchdog controlling unit 20, and a watchdog generating unit 30. A processor 10 processes data in hardware manner. The watch dog controlling unit 20 controls general restoration operations by outputting a sensing signal WD_ST for the processor 10 to the watchdog generating unit 30 and outputting a Non Maskable Interrupt (NMI) to the processor 10 when receiving a first time out signal from the watchdog generating unit 30. The watchdog generating unit 30 determines that the processor 10 is in an abnormal state if the watchdog generating unit 30 does not receive a sensing signal WD_ST from the watchdog controlling unit 20 within a predetermined interval. Then, the watchdog generating unit 30 generates a first timeout signal to the watchdog controlling unit 20.

Here, the watchdog controlling unit 20 includes a watchdog state register 21 for providing watchdog information to the process 10. Also, the watchdog generating unit 30 includes a watchdog timer 31.

The fault management apparatus according to the related art will be described in more detail. The watchdog controlling unit 20 generates a sensing signal WD_ST and outputs the generated sensing signal WD_ST to the watchdog generating unit 30 at a predetermined interval which is set by the processor 10. If the watchdog generating unit 30 does not receive the sensing signal WD_ST from the watchdog controlling unit 20 within the predetermined interval, the watchdog generating unit 30 outputs the first timeout signal to the watchdog controlling unit 20. Accordingly, the watchdog controlling unit 20 outputs the Non Maskable Interrupt (NMI) to the processor 10 to perform the restoration operation.

After outputting the first timeout signal, if the watchdog generating unit 30 does not receive the sensing signal WD_ST within a predetermined interval again, the watchdog generating unit 30 outputs a second timeout signal to the watchdog controlling unit 20. Then, the watchdog controlling unit 20 determines that the processor 10 is in a malfunction state where the restoration is unable and resets the processor 10.

As described above, if a hardware board with a processor mounted malfunctions or if software generates endless loop due to a program fault, the fault management apparatus according to the related art generates the Non Maskable Interrupt (NMI) before resetting the processor in order to restore the processor from an abnormal state to a normal state. If the abnormal state is sustained, the fault management apparatus according to the related art resets the processor through board resetting.

As described above, the fault management technology according to the related art only considers the abnormal state of a processor and the endless loop state of software. Therefore, the fault management technology according to the related art is not suitable for a complex system like a home network where faults are generated from various devices although the fault management technology according to the related art is applicable to a simple system.

SUMMARY OF THE INVENTION

An embodiment of the present invention is directed to providing a fault model and rule based fault management apparatus and method for improving the reliability of a home network and reducing a maintenance cost of a home network by defining fault models for possible faults generated from various fault generation apparatus distributed in a home network, such as a device, a network, a system, and an application program, defining fault decision rules for diagnosing a cause of a fault, defining fault process rules for each cause, and diagnosing and processing a fault based on the defined fault model, the defined fault decision rules, and the defined fault process rules when the fault is generated in a home network.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided a fault management apparatus including: a plurality of fault generation unit formed in a multilevel structure and generating fault notification when a fault is generated; a plurality of fault communication unit for transferring fault notification from one of the fault generation unit; a fault agent unit for transferring each fault notification from a plurality of the fault communication unit; and a fault diagnosis and process unit for receiving the fault notification from the fault agent unit, diagnosing a corresponding fault, and processing the corresponding fault using a fault model, a fault decision rule, and a fault process rule.

In accordance with an aspect of the present invention, there is provided a fault management method including: at a fault agent, receiving an initial message for registration from a plurality of fault generation apparatuses; at a fault manager, receiving the initial message from the fault agent and registering the fault generation apparatuses using the initial message; at the fault agent, receiving fault notification from the fault generation apparatuses and transferring the received fault notification to the fault manager; and at the fault manager, diagnosing a fault and processing a corresponding fault using the received fault notification.

BRIEF DESCRIPTION OF THE DRAWINGS

FIG. 7 is a flowchart of a fault management method in a fault management apparatus in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter.

A fault model and rule based fault management apparatus and method for a home network according to the present invention can accurately diagnose and process faults by defining fault models for possible faults generated from various fault generation apparatus such as devices, networks, systems, and application programs and defining fault decision rules and fault process rules.

That is, fault generation apparatuses are classified into a device level, a network level, a system level, and an application program level, and a multilevel fault processing mechanism is defined for processing faults through a fault agent, a fault communication module API, and a fault manager. Based on the multilevel fault processing mechanism, a fault can be accurately diagnosed and processed in the fault model and rule based fault management apparatus and method for a home network according to the present invention.

Figure 1:
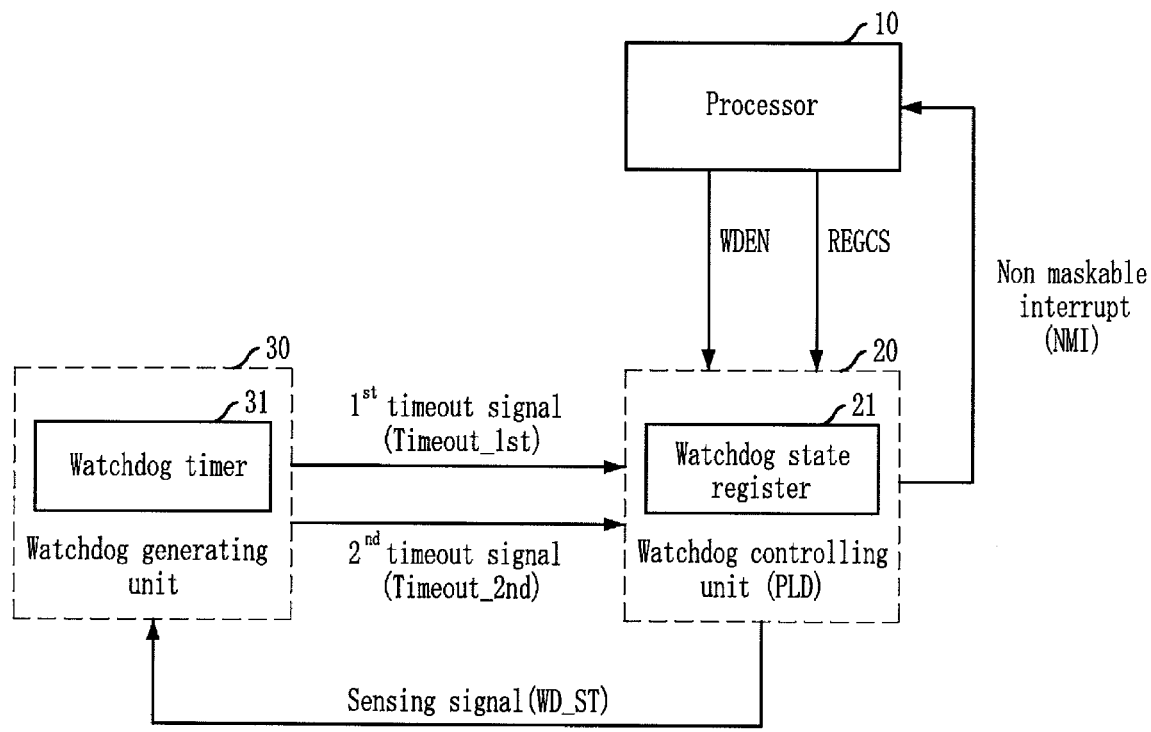
FIG. 1 is a diagram illustrating an apparatus for sensing faults and restoring from the sensed fault according to the related art.
Figure 2:
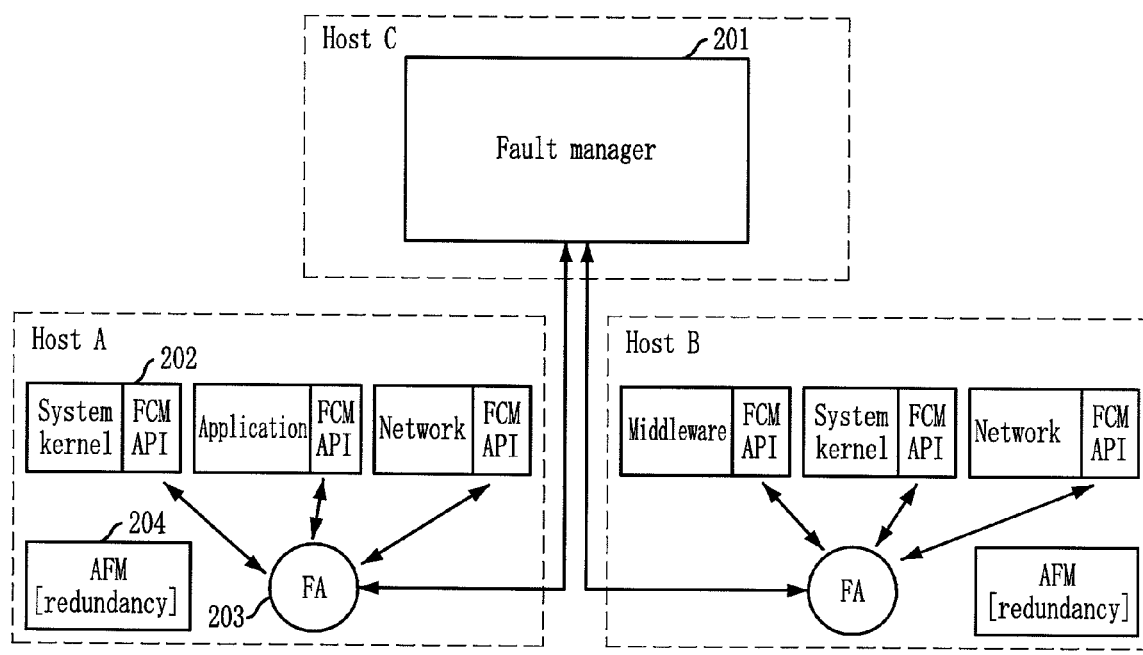
FIG. 2 is a block diagram depicting a fault model and rule based fault management apparatus in a home network in accordance with an embodiment of the present invention.

FIG. 2 is a block diagram depicting a fault model and rule based fault management apparatus in a home network in accordance with an embodiment of the present invention.

As shown in FIG. 2, the fault model and rule based fault management apparatus according to the present embodiment includes a fault agent (FA) 203 and an autonomous fault manager 201. The fault agent 203 receives fault information (fault notification) from various fault generation apparatuses and transfers the received fault notification to the fault manager 201. Here, the various fault generation apparatuses are devices, networks, systems, and application programs. The autonomous fault manager (AFM) 201 defines fault modules for possible faults generated from a home network and defines fault decision rules for diagnosing the causes of faults and fault process rules for the diagnosed causes. The fault manager 201 diagnoses and processes faults based on the fault models, the fault decision rules, and the fault process rules when the fault manager 201 receives the fault notification about each of the fault generation apparatus from the fault agent 203.

The fault generation apparatuses of the home network transfer fault notification to the fault agent 203 through a fault communication module 202 when a fault is generated from the home network. For example, the fault communication module 202 may be realized as a multilevel API type. In case of a device, the fault notification is transferred through home network middleware that forms and manages a corresponding device, such as LonWorks, HAVi, UPnP, and JINI. In case of a network, the fault notification is transferred by network resources. In case of a system, the fault notification is transferred through a system kernel. In case of the application program, the fault notification is transferred as a processable format of a corresponding application program to the fault agent 203.

Each of hosts such as a host A and a host B may include the fault agent 203 of the fault management apparatus according to the present embodiment. The fault agent 203 exchanges an initial message with the fault generation apparatuses for previously registering the fault generation apparatuses and transfers the fault notification from the fault generation apparatuses to the fault manager 201. The exchange of the initial message will be described in more detail with reference to FIG. 3.

The fault manager 201 according to the present embodiment has a self-restoration redundancy function that enables a shadow fault manager 204 to operate as a primary based on a primary-shadow structure if the fault manager 201 malfunctions while the fault manger 201 operates as a primary. The detail configuration and operation of the fault manager 201 will be described in later with reference to FIG. 6. Also, the fault manager 201 may be included in a host independently from the fault agent 203.

Figure 3:
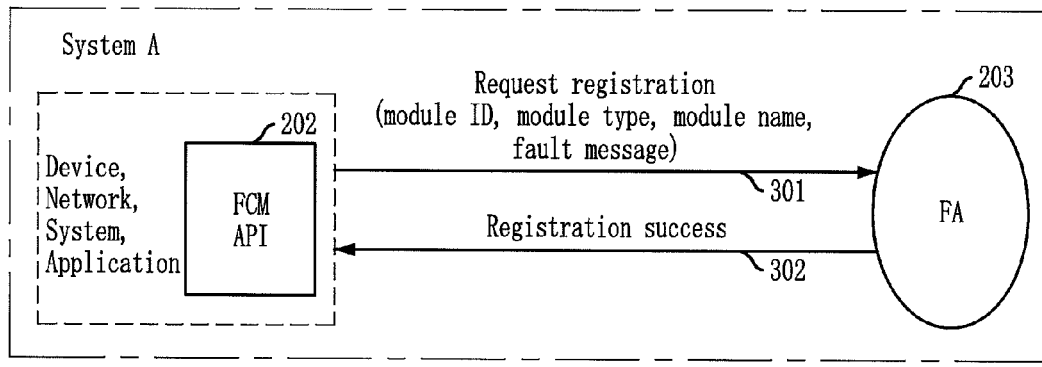
FIG. 3 is a flowchart of a method for exchanging an initial message between a fault agent and fault generation devices in a fault management apparatus in accordance with an embodiment of the present invention.

FIG. 3 is a flowchart of a method for exchanging an initial message between a fault agent and fault generation apparatuses in a fault management apparatus in accordance with an embodiment of the present invention.

Referring to FIG. 3, various fault generation apparatuses, such as a device, a network, a system, and an application program, request the fault agent 203 to register the various fault generation apparatus to the fault manager 201 at step S301. That is, the fault generation apparatuses transfer an initial message as a registration request to the fault agent 203.

The initial message may include a module ID, a module type, a module name, and a fault message. The module ID is an unique identification (ID) of a module, for example, "SM1234". The module type may be, for example, SM, AAM, application, or UMB adaptor. The module name may be a home theater service, a LonWorks adaptor, or an UPnP adaptor. The fault message provides fault notification that is understandable and processable to each of modules.

At step S302, the fault agent 203 informs a corresponding fault generation apparatus of registration success. That is, the fault agent 203 registers the fault generation apparatuses at the fault manager 201 by transferring the fault notification from each of the fault generation apparatuses to the fault manager 201. Then, the fault agent 203 informs the corresponding fault generation apparatuses of the registration success if the fault generation apparatuses are successfully registered by the fault manager 201.

Since each of the fault generation apparatuses is registered at the fault manager 201 through the fault agent 203 by transmitting/receiving the initial message, related data can be quickly exchanged when a predetermined module of a fault generation apparatus generates a fault.

Figure 4:
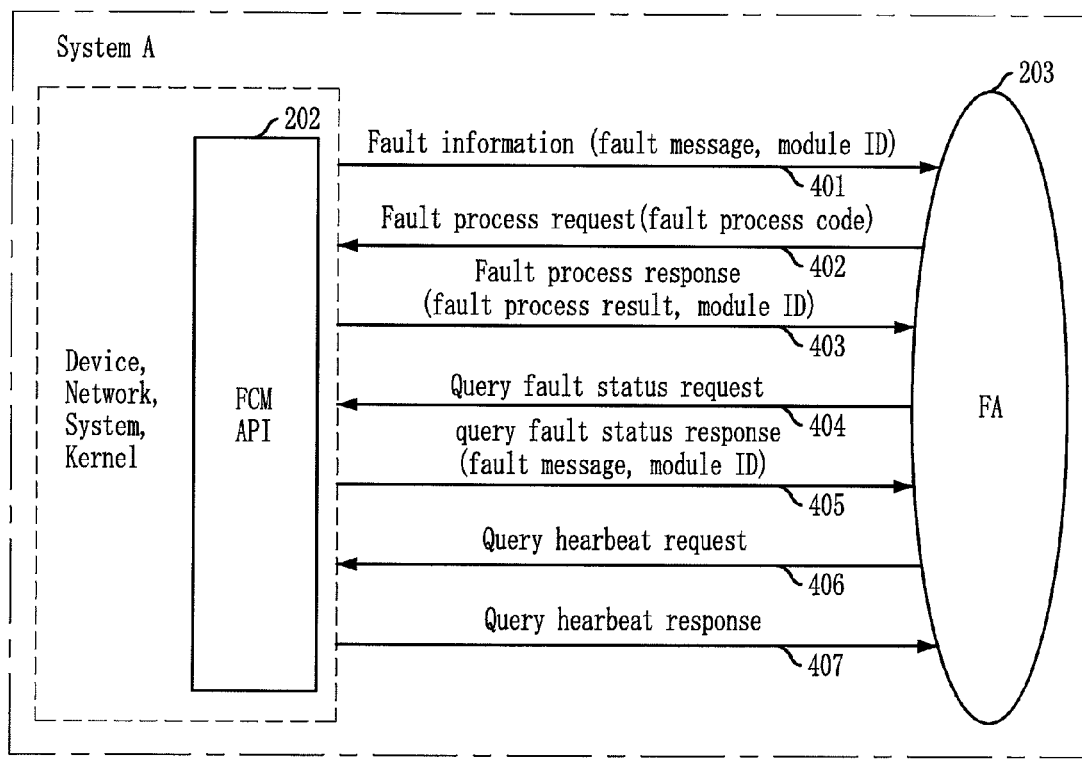
FIG. 4 is a diagram for describing message exchange between a fault agent and fault generation devices when a fault is generated.

FIG. 4 is a diagram for describing message exchange between a fault agent and fault generation devices when a fault is generated. In FIG. 4, the message exchange will be described using a plurality of fault generation apparatuses in a system A as examples.

As shown in FIG. 4, each of the fault generation apparatuses of the system A transfers fault notification from a corresponding module to the fault agent 203 through the fault communication module 202 at step S401. The fault notification includes a fault message and a module ID.

The fault agent 203 receives the fault notification from each of the fault generation apparatuses and transfers the received fault notification to the fault manager 201 in order to enable the fault manager 201 to perform necessary operations such as fault diagnosis and fault process for managing the fault.

At step S402, the fault agent 203 transfers a fault process request including a fault process code to a corresponding fault generation apparatus through a fault communication module 202. Then, the fault agent 203 receives a result process response through the fault communication module 202 at step S403. Here, the fault process response includes a fault process result and a module ID.

At step S404, the fault agent 203 transfers a query fault status request to the fault generation apparatus through the fault communication module 202. Then, the fault agent 203 receives a query fault status response for the query fault status request through the fault communication module 202 at step S405. Here, the query fault status response includes a fault message, and a module ID.

The fault agent 203 can monitor a target module at regular interval through heartbeat check. That is, the fault agent 203 transfers a query hearbeat request to the fault generation apparatus through the fault communication module 202 at step S406. If the fault agent 203 does not receive a query hearbeat response for the transferred query hearbeat request through the fault communication module 202, the fault agent 203 determines that a corresponding module generates a fault at step S407 and informs the fault manager 201 of the fault generation in the corresponding module.

In order to provide the fault diagnosis and process method according to the present embodiment, the fault manager 201 uses a module management table. The module management table will be described with reference to FIG. 5.

Figures 5, 6:
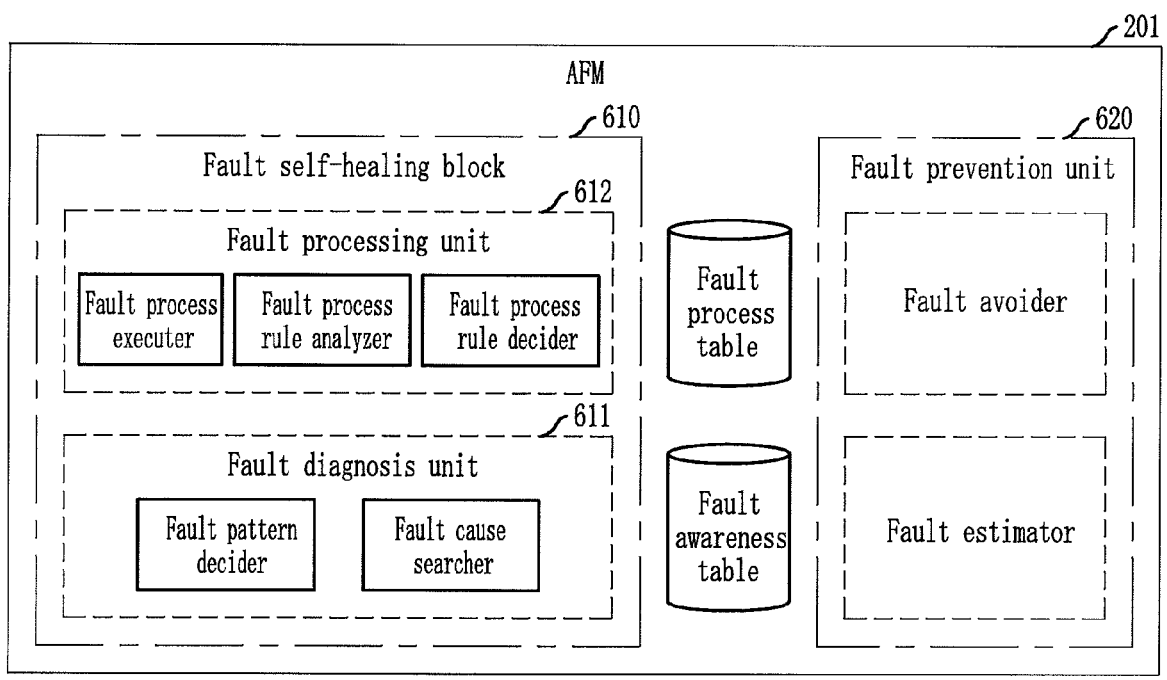
FIG. 5 is a diagram of a module management table of a fault manager in a fault management apparatus in accordance with an embodiment of the present invention.
FIG. 6 is a diagram illustrating a fault manager in accordance with an embodiment of the present invention.

FIG. 5 is a diagram illustrating a module management table of a fault manager in a fault management apparatus in accordance with an embodiment of the present invention.

As shown in FIG. 5, the fault manger 201 stores information about the fault generation apparatuses in the module management table when each of the fault generation apparatuses is registered. The module management table includes a system field for denoting a target system, a fault agent ID field for identifying a corresponding fault agent that transfers fault notification, a module ID field for identifying a target module to manage, a module type field for denoting a type of a target module to manage, and a module name field for denoting a name of a target module to manage.

The system field is a field for identifying each of target systems to manage in a home network such as a system A or a system B. The fault agent ID field stores an ID of a corresponding fault agent that transfers fault notification. The module ID field stores an ID of a predetermined target module to manage in the target system to manage. The module type field denotes a type of a target module to manage, such as an application, a network, a kernel, and a device. The module name field denotes a name of a target module to manage, such as an application program, a network resource, a system kernel, and a LonWorks. The fault manager 201 may stores the module management table in an internal or an external memory.

FIG. 6 is a diagram illustrating a fault manager in accordance with an embodiment of the present invention.

As shown in FIG. 6, the fault manager 201 according to the present embodiment includes a fault self-healing block for processing a corresponding fault when a predetermined fault generation apparatus generates actual faults and a fault prevention unit 620 for preventing faults from being generated. Here, the fault self-healing block 610 and the fault prevention unit 620 use a fault process table and a fault awareness table.

The fault self-healing block 610 includes a fault diagnosis unit 611 for diagnosing a fault, and a fault processing unit 612 for processing the fault based on the diagnosing result at the fault diagnosis unit 611.

Here, the fault diagnosis unit 611 includes a fault pattern decider for receiving fault notification from the fault agent 203 and determining which of fault models is related to a generated fault based on the received fault notification and a fault cause searcher for searching the cause of the fault based on the fault decision rule.

The fault processing unit 612 processes a fault based on a corresponding process rule of the searched cause from the fault cause searcher. Here, the fault processing unit 612 includes a fault process rule decider for deciding which of fault process rules to apply based on a corresponding cause when the fault cause searcher diagnoses a fault, a fault process rule analyzer for analyzing the decided fault process rule, and a fault process executer for processing the fault according to the analysis result from the fault process rule analyzer.

Meanwhile, the fault prevention unit 620 includes a fault estimator for monitoring system status data by recording a system operation log and informing a possible fault if the monitored system status data is probabilistically close to generate a fault, and a fault avoider for informing a corresponding module of the estimation result through the fault agent 203 for preventing a fault from being generated based on the estimation result of the fault estimator.

FIG. 7 is a flowchart of a fault management method in a fault management apparatus in accordance with an embodiment of the present invention.

Referring to FIG. 7, at step S701, the fault agent 203 receives an initial message from a plurality of fault generation apparatuses such as a device, a network, a system, and an application program for registering the fault generation apparatuses at the fault manager 201. The initial message may include a module ID, a module type, a module name, and a fault message.

At step S702, the fault agent 203 transfers the received initial message to the fault manager 201. At step S703, the fault manager 201 registers each of the fault generation apparatuses as target modules to manage using the initial message. That is, the fault agent 203 stores information of each fault generation apparatus in a system field, a fault agent ID field, a module ID field, a module type field, and a module name field of a module management table.

At step S704, the fault agent 203 receives fault notification from a plurality of the fault generation apparatuses. Then, at step S705, the fault agent 203 transfers the received fault information to the fault manager 201. The fault information includes a fault message and a module ID.

At step S706, the fault manager 201 diagnoses a fault using the transferred fault notification and processes the corresponding fault based on the diagnosing result.

That is, the fault diagnosis unit of the fault manager 611 receives the fault notification from the fault agent 203, determines a corresponding fault model based on the received fault notification, and finds a cause of the fault based on a fault decision rule.

Then, the fault processing unit 612 of the fault manager 201 processes a fault corresponding to a fault process rule based on the diagnosing result of the fault diagnosis unit 611. Here, the fault processing unit 612 decides one of fault process rules, analyses the decided fault process rule, and process the fault based on the analysis result.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

As described above, the fault model and rule based fault management apparatus and method according to the present invention can improve the reliability of a home network and reduce a maintenance cost of a home network by defining fault models for possible faults generated from various fault generation apparatus distributed in a home network, such as a device, a network, a system, and an application program, defining fault decision rules for diagnosing a cause of a fault, defining fault process rules for each cause, and diagnosing and processing a fault based on the defined fault model, the defined fault decision rules, and the defined fault process rules when the fault is generated in a home network Also, the fault model and rule based fault management apparatus and method according to the present invention can prevent a fault by estimating a possible fault and performing necessary operations based on the estimated possible fault.

While the present invention has been described with respect to certain preferred embodiments, it will be apparent to those skilled in the art that various changes and modifications may be made without departing from the spirits and scope of the invention as defined in the following claims.

What is claimed is:

1. A fault management apparatus comprising:
a plurality of fault generation means formed in a multilevel structure of a home network and generating fault notification when a fault is generated;
a plurality of fault communication means for transferring fault notification from one of the fault generation means;
a fault agent means for transferring each fault notification from a plurality of the fault communication means; and
a fault diagnosis and process means for receiving the fault notification from the fault agent means, diagnosing a corresponding fault, and processing the corresponding fault using a fault model, a fault decision rule, and a fault process rule,
wherein each of the plurality of fault generation means is configured to be classified into a different API (application programming interface) type for each of at least two or more different levels of the multilevel structure of the home network,
wherein each of the different API types for each of the at least two or more different levels of the multilevel structure of the home network transfer their respective fault notification from their respective fault communication means to the fault agent means according to a software program acceptable to the respective API type which is transferring the fault notification,
wherein each of the software programs acceptable to their respective API type are different,
wherein the fault agent means transfers each the respective fault notifications from the at least two or more different API types for each of the at least two or more different levels of the multilevel structure of the home network to the fault diagnosis and process means using the same software program for each of the different levels of the multilevel of the home network as was received.

2. The fault management apparatus of claim 1, wherein the fault diagnosis and process means defines each of possible faults generated from a plurality of the fault generation means as the fault modules, defines the fault decision rules for diagnosing causes of faults, defines the fault process rules for each cause, and diagnoses and process a corresponding fault using the fault model, the fault decision rule, and the fault process rule if the fault diagnosis and process means receives fault information from the fault agent means.

3. The fault management apparatus of claim 1, wherein the fault diagnosis and process means has a self-restoration redundancy function through a primary-shadow structure.

4. The fault management apparatus of claim 1, wherein the fault diagnosis and process means includes:
a fault self-healing means for processing a corresponding fault when an actual fault is generated from one of the fault generation means; and
a fault preventing means for preventing a fault from being generated.

5. The fault management apparatus of claim 4, wherein the fault self-healing means includes:
a fault diagnosing means for diagnosing a fault; and
a fault process means for processing a fault according to the diagnosing result of the fault diagnosing means.

6. The fault management apparatus of claim 5, wherein the fault diagnosing means includes:
a fault pattern deciding unit for determining which of the fault models where a corresponding fault belongs to based on the fault notification transferred from the fault agent means; and
a fault cause search means for finding causes of a fault based on the fault decision rule.

7. The fault management apparatus of claim 6, wherein the fault process means process a fault based on a fault process rule of a corresponding cause if a fault is diagnosed by the fault diagnosis and process means.

8. The fault management apparatus of claim 7, wherein the fault process means includes:
a fault process rule decision means for determining which fault process rule is applied according to a corresponding cause based on the diagnosing result of the fault diagnosis and process means;
a fault process rule analysis means for analyzing the decided fault process rule from the fault process rule decision means; and a fault process execution means for processing a fault based on the analysis result of the fault process rule analysis means.

9. The fault management apparatus of claim 4, wherein the fault prevention means includes:
a fault estimating means for monitoring system status data by recording a system operation log and informing a possible fault if the monitored system status data is probabilistically close to a predetermined fault model; and
a fault avoidance means for informing a corresponding fault generation apparatus of a possible fault through the fault agent means in order to prevent a fault based on the estimating result of the fault estimating means.

10. The fault management apparatus of claim 4, wherein each of the fault generation means transfers fault notification of a corresponding module that generates the fault to the fault agent means through the fault communication module, and the fault agent means receives the fault notification through the fault communication means and transfers the fault notification to the fault diagnosis and process means,
the fault agent means transfers a fault process request to a corresponding fault generation means through the fault communication means and receives a fault process response from the corresponding fault generation means, and the fault generate means transfers a query fault status request to a corresponding fault generation means through the fault communication means and receives a query fault status response from the corresponding fault generation means, and
the fault agent means monitors a target module to manage at a regular interval.

11. The fault management apparatus of claim 10, wherein the fault agent means determines that a corresponding module generates a fault if the fault agent means does not receive a query hearbeat response after transferring a query hearbeat request to the fault generation means through the fault communication module and reports the generation of the fault to the fault diagnosis and process means.

12. A fault management method comprising the steps of:
at a fault agent, receiving an initial message for registration from a plurality of fault generation apparatuses formed in a multilevel structure of a home network;
at a fault manager, receiving the initial message from the fault agent and registering the fault generation apparatuses using the initial message;
at the fault agent, receiving fault notification from the fault generation apparatuses and transferring the received fault notification to the fault manager; and
at the fault manager, diagnosing a fault and processing a corresponding fault using the received fault notification,
wherein each of the plurality of fault communication apparatused transfers the fault notification from one of the fault generation apparatuses
wherein each of the plurality of fault generation apparatuses are configured to be classified into a different API (application programming interface) type for each level of the multilevel structure of the home network,
wherein each of the different API types for each of the at least two or more different levels of the multilevel structure of the home network transfer their respective fault notification from their respective fault communication apparatus to the fault agent apparatus according to a software program acceptable to the respective API type which is transferring the fault notification,
wherein each of the software programs acceptable to their respective API type are different,
wherein the fault agent apparatuses transfers each the respective fault notifications from the at least two or more different API types for each of the at least two or more different levels of the multilevel structure of the home network to the fault diagnosis and process means using the same software program for each of the different levels of the multilevel of the home network as was received.

13. The fault management method of claim 12, wherein the diagnosing a fault and processing a corresponding fault includes the steps of:
self-healing a corresponding fault when an actual fault is generated in a fault generation apparatus; and
preventing a fault from being generated.

14. The fault management method of claim 13, wherein the self-healing a corresponding fault includes the steps of:
diagnosing a fault; and
processing a fault based on the diagnosing result.

15. The fault management method of claim 14, wherein the diagnosing a fault includes the steps of:
determining which of previously defined fault models where a fault belongs to based on fault notification from the fault agent; and
searching a cause of a corresponding fault based on a fault decision rule.

16. The fault management method of claim 15, wherein in the processing a fault, a fault is processed based on a fault process rule for a corresponding cause if a fault is diagnosed in the diagnosing a fault.

17. The fault management method of claim 16, wherein the processing a fault includes the steps of:
deciding which of fault process rules to apply based on a corresponding cause of a fault when a fault is diagnosed in the diagnosing a fault;
analyzing the decided fault process rule; and
processing a fault based on the analyzing result.

18. The fault management method of claim 13, wherein the preventing a fault includes the steps of:
informing a possible fault if system status data is probabilistically close to a predetermined fault model while monitoring the system status data by recording a system operation log; and
informing a corresponding module of the possible fault through the fault agent in order to prevent a fault from being generated according to the estimating result.

19. The fault management method of claim 12, wherein in the registering the fault generation apparatuses using the initial message, a fault manager receiving the initial message from the fault agent stores information about each of the fault generation apparatuses to a system field, a fault agent ID field, a module ID field, a module type field, and a module name field of a module management table.

20. The fault management method of claim 12, wherein the initial message includes a module ID, a module type, a module name, and a fault message.

* * * * *